G. CORNWALL.
WHEEL-TIRES.

No. 180,847. Patented Aug. 8, 1876.

WITNESSES:
C. Neveux
John Goethals

INVENTOR:
G. Cornwall
BY
ATTORNEYS.

UNITED STATES PATENT OFFICE.

GEORGE CORNWALL, OF GARDEN CITY, NEW YORK.

IMPROVEMENT IN WHEEL-TIRES.

Specification forming part of Letters Patent No. 180,847, dated August 8, 1876; application filed February 28, 1876.

*To all whom it may concern:*

Be it known that I, GEORGE CORNWALL, of Garden City, in the county of Queens and State of New York, have invented a new and Improved Wheel-Tire, of which the following is a specification:

My invention consists of a tire for wagon-wheels of all kinds; also car and other wheels, the essential part of which is rawhide, which I consider to be more durable than metal, also easier for the carriage, and less noisy.

The hide is fitted on a metal hoop while in a soft state for fixing it in the required shape, and an elastic cushion of rubber is interposed between the hide and the metal band; but this may be used or not, and the rawhide band may be applied to some kinds of wheels without the metal band by fixing it directly to the rim of the wheel.

Figure 1:
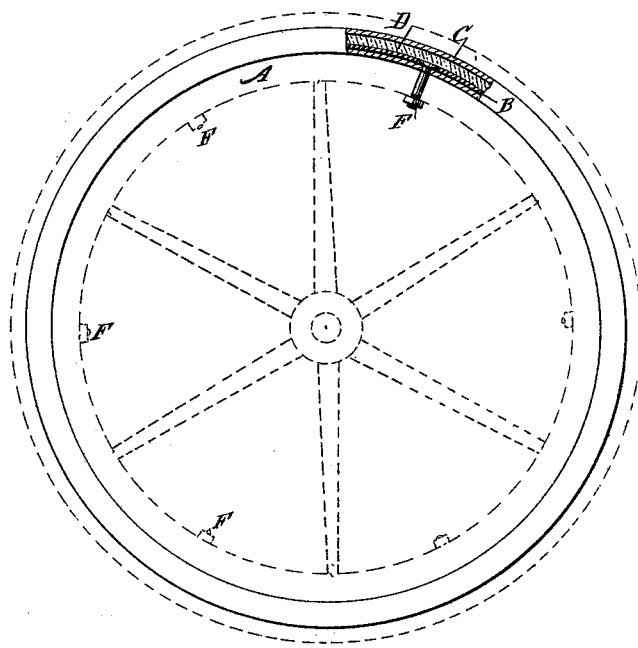
Figure 2:
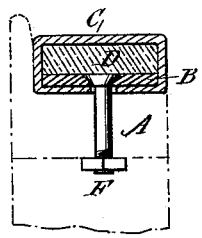

Figure 1 is a side elevation of a wheel with my improved tire, a part being shown in section. Fig. 2 is a transverse section taken through the rim and tire.

Similar letters of reference indicate corresponding parts.

A represents the wheel-rim; B, the metal band, on which the rawhide C is fitted; and D, the rubber cushion between the hide and the metal band. The hide C is bent up around the edges of the rubber and the metal, and on the interior of the metal band, between which and the face of the wheel A it is to be firmly secured when pressed on the wheel tightly. Bolts F will then be screwed from the inside of the wheel-rim into the metal band B, to keep it from working off the wheel. The rawhide will be bent around the metal band when in a soft state, in which it will assume the form required, which form it will retain when dry. While in the soft state it may be temporarily secured in any approved way, to confine it until sufficiently dry to retain the shape alone.

Having thus described my invention, I claim as new and desire to secure by Letters Patent—

1. A carriage-wheel having a rawhide tire, C, constructed substantially as described, for the purpose specified.

2. The combination of the rawhide tire C and the metal band B, substantially as specified.

3. The combination of the rawhide tire C, metal band B, and rubber cushion D, substantially as specified.

GEO. CORNWALL.

Witnesses:
T. B. MOSHER,
ALEX. F. ROBERTS.